United States Patent
Kosugi

(10) Patent No.: US 8,446,685 B2
(45) Date of Patent: May 21, 2013

(54) SERVO FRAME INTERVAL CORRECTION APPARATUS, STORAGE APPARATUS AND SERVO FRAME INTERVAL CORRECTION METHOD

(75) Inventor: Tatsuhiko Kosugi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1272 days.

(21) Appl. No.: 12/212,310

(22) Filed: Sep. 17, 2008

(65) Prior Publication Data

US 2009/0086598 A1    Apr. 2, 2009

(30) Foreign Application Priority Data

Sep. 28, 2007   (JP) ................................. 2007-253694

(51) Int. Cl.
*G11B 5/09*   (2006.01)

(52) U.S. Cl.
USPC .......................................................... 360/51

(58) Field of Classification Search
None
See application file for complete search history.

(56) References Cited

U.S. PATENT DOCUMENTS

| | | | |
|---|---|---|---|
| 5,153,788 A * | 10/1992 | Nishikawa et al. ........ 360/77.08 |
| 5,576,906 A | 11/1996 | Fisher et al. |
| 5,825,568 A * | 10/1998 | Lee ................................. 360/51 |
| 5,862,005 A | 1/1999 | Leis et al. |
| 6,081,397 A * | 6/2000 | Belser .............................. 360/51 |
| 6,115,199 A * | 9/2000 | Bang ................................ 360/51 |
| 6,452,990 B1 | 9/2002 | Leis et al. |
| 6,839,194 B2 * | 1/2005 | Koyanagi ......................... 360/51 |
| 7,126,776 B1 * | 10/2006 | Warren et al. ................... 360/51 |
| 7,440,211 B2 * | 10/2008 | Cho et al. ......................... 360/51 |
| 8,174,784 B2 * | 5/2012 | Grundvig et al. ............... 360/51 |
| 2005/0286152 A1 | 12/2005 | Fujii et al. |

FOREIGN PATENT DOCUMENTS

| | | |
|---|---|---|
| JP | A 10-507027 | 7/1998 |
| JP | A 11-353831 | 12/1999 |
| JP | A 2003-45129 | 2/2003 |
| JP | A 2004-139677 | 5/2004 |
| JP | A 2006-12350 | 1/2006 |
| WO | WO 96/11470 | 4/1996 |

\* cited by examiner

*Primary Examiner* — K. Wong

(74) *Attorney, Agent, or Firm* — Greer, Burns & Crain, Ltd.

(57) ABSTRACT

One aspect of the embodiment utilizes a servo frame interval correction apparatus which includes a detection unit for detecting a first servo frame formed on said recording medium. The apparatus includes an acquiring unit acquiring a detection time interval between said first servo frame and a second servo frame detected subsequently to the first servo frame from a table storing a detection time interval between a specific servo frame and a servo frame detected subsequently to the specific servo frame. The apparatus includes a differential calculation unit calculating a differential between the detection time interval acquired by said acquiring unit and a reference time interval; and a correction unit correcting an estimated position of said second servo frame based on the differential calculated by said differential calculation unit.

15 Claims, 9 Drawing Sheets

FIG.5

$$x(t+\Delta t) = x + v\Delta t + \tfrac{1}{2} a \Delta t^2$$
$$v(t+\Delta t) = v + a \Delta t$$
··· (EQUATION 1)

$$\begin{bmatrix} Pos(t+td) \\ Vel(t+td) \end{bmatrix} = \begin{bmatrix} 1 & Td/Ts & 1/2\,(Td/Ts)^2 \\ 0 & 1 & Td/Ts \end{bmatrix} \begin{bmatrix} Pos(t) \\ Vel(t) \\ U \end{bmatrix}$$
··· (EQUATION 2)

$$\begin{bmatrix} Pos(t+ts) \\ Vel(t+ts) \end{bmatrix} = \begin{bmatrix} 1 & 1 & 1/2 \\ 0 & 1 & 1 \end{bmatrix} \begin{bmatrix} Pos(t) \\ Vel(t) \\ U \end{bmatrix}$$
··· (EQUATION 3)

FIG.6

$$\begin{bmatrix} Pos(ts(1+\Delta)) \\ Vel(ts(1+\Delta)) \end{bmatrix} = \begin{bmatrix} 1 & 1+\Delta & 1/2(1+\Delta)^2 \\ 0 & 1 & 1+\Delta \end{bmatrix} \begin{bmatrix} Pos(0) \\ Vel(0) \\ U \end{bmatrix} \quad \cdots \text{(EQUATION 4)}$$

$$\begin{aligned}(1+\Delta)^2 &= 1+2\Delta \\ 1/(1+\Delta) &= 1-\Delta \\ (1+\Delta) \times (1-\Delta) &= 1-\Delta^2 = 1 \end{aligned} \quad \cdots \text{(EQUATION 5)}$$

$$\begin{bmatrix} Pos(ts(1+\Delta)) \\ Vel(ts(1+\Delta)) \end{bmatrix} = \begin{bmatrix} 1 & 1+\Delta & 1/2(1+2\Delta) \\ 0 & 1 & 1+\Delta \end{bmatrix} \begin{bmatrix} Pos(0) \\ Vel(0) \\ U \end{bmatrix} \quad \cdots \text{(EQUATION 6)}$$

FIG.7

$$Pos(t_s(1+\Delta)) = Pos(t_s) + \Delta \times Vel + \Delta \times U$$
$$Vel(t_s(1+\Delta)) = Vel(t_s) + \Delta \times U \quad \cdots (\text{EQUATION 7})$$

$$Pos(t_s(1+\Delta)) = Pos(t_s) + \Delta \times Vel \quad \cdots (\text{EQUATION 8})$$

SERVO FRAME INTERVAL CORRECTION APPARATUS, STORAGE APPARATUS AND SERVO FRAME INTERVAL CORRECTION METHOD

CROSS-REFERENCE TO RELATED APPLICATION

This application is based upon and claims the benefit of priority to Japanese Patent Application No. 2007-253694, filed on Sep. 28, 2007, the entire contents of which are incorporated herein by reference.

BACKGROUND

1. Field

The embodiment discussed herein are directed to a servo frame interval correction method in a storage apparatus for correcting intervals between servo frames formed on a recording medium having a deviation from the center of rotation.

2. Description of Related Art

A magnetic head positioning control method controlled by a conventional magnetic disk drive will be disclosed with reference to FIG. 1.

A manipulated variable u 101 is input to an actual mechanics 102 as a driving electric power value of a power amplifier for a voice coil motor. Then, a demodulated position 103 is an actual position of the servo frame read with the magnetic head moved by the actual mechanics 102. Conventionally, the magnetic disk drive calculates a position and velocity of a subsequent servo frame by adding a control matrix $Z^{-1}$ to a present position of the magnetic head (calculated position 104), to a present velocity of the magnetic head (calculated velocity 105), and to a calculated external force 106, which is a bias component, respectively. The control matrix $Z^{-1}$ will be described in detail later.

However, errors will be accumulated gradually with this calculation method.

Thus, the magnetic disk drive calculates a differential between the calculated position 104 and the demodulated position 103 as an estimation error 107. Then the estimation error 107 is added to a coefficient of the calculated position Lp, a coefficient of the calculated velocity Lv, and a coefficient of the calculated external force Lb, respectively. Then, the position of the servo frame to be detected subsequently (estimated position 108) is calculated by adding up a summation of the calculated error 107 and the coefficient Lp and a summation of the control matrix and the calculated position 104. Likewise, estimated velocity 109 on reaching the subsequent servo frame, and an estimated external force 110 are calculated by the magnetic disk drive.

Using proportional-integral-derivative control (PID control), a manipulated variable u 111 is determined by adding up a summation of the estimated position 108 and a proportional term Kp, and a summation of the estimated velocity 109 and a derivative term Kv. The magnetic head is controlled according to the manipulated variable u 111 determined above. The estimated external force 110 is not taken into consideration in the determination of the manipulated variable u because the estimated external force is processed outside of the PID control.

Thus, the magnetic head is correctly positioned according to the manipulated variable u. Then, when the process to search for the subsequent servo frame switches, an estimated position and an estimated velocity of the subsequent servo frame are derived by substituting the estimated position for a calculated position, the estimated velocity for a calculated velocity, and the estimated external force for a calculated external force.

A digital signal processor (DSP) may detect a demodulated position and a current applied to a magnetic head incorporated in the magnetic disk drive via a power amplifier by the DSP. There are two calculations to obtain the velocity of the magnetic head: one is to obtain the velocity from a differential between positions; and the other is to obtain the velocity by integrating an acceleration based on the current. In modern control methods, the velocity is typically derived by integrating the acceleration.

The control of the magnetic head position described above is designed on an assumption that servo frames are obtained at equal-spaced intervals.

There has been a control apparatus employing a conventional technique relating to the present technique for positioning a magnetic head, correcting a variation of a servo signal attributed to a run-out error caused by decentering of a disk.

Further, a technique with which position of a head incorporated in a disk drive is detected by synchronizing detailed position information has been disclosed. Additionally, a technique for reducing unnecessary disk format margin is employed to increase disk format efficiency. Reference documents are Japanese Laid-open Patent Publication Nos. 1999-353831, 1998-507027, 2006-12350.

However, for a magnetic disk drive employing a stack servo track writer (SSTW), servo frames are infinitesimally deviated from the center of rotation due to a mismatch between the rotation centers of the SSTW and a magnetic disk drive in which a magnetic disk is incorporated.

Thus, the magnetic head traces an elliptic track, which causes the lengths of the servo frames to vary. The conventional control system is designed with an assumption that position signals are detected at equal-spaced intervals. However, the intervals between the servo frames become irregular because of the elliptic track. The variation in the servo frame detection time intervals is not a problem when seek velocity is slow. However, as the seek velocity becomes faster, the variation in the servo frame detection time intervals affects seeking accuracy to a greater degree.

Given that the magnetic head moves 300 tracks from one servo frame to another servo frame, and the magnetic head is positioned 30 mm away from the center of rotation, and the decentering of the recording medium is 30 um, the error is 0.1% when converted to time. Where the head moves over 300 tracks, the error is 0.3 tracks, which is insignificant. However, where the errors are accumulated in the control system, positioning a target is difficult due to the positioning errors. As a result the seek time is increased which leads to reduced access times and a deterioration in the performance of the magnetic disk drive.

This is thought to be because of the problem of servo frame variations, in the form of calculated errors that arise due to the difference between the estimated position and the actual position of the magnetic head, included in the control system.

The embodiment of the present invention is disclosed to solve the problem mentioned above.

Accordingly, an object of the embodiment is to provide a servo frame interval correction apparatus, a storage apparatus, and a servo frame interval correction method for correcting estimated positions (or calculated positions).

SUMMARY

In keeping with one aspect of an embodiment of this technique, a servo frame interval correction apparatus includes a detection unit for detecting a first servo frame formed on said recording medium. The apparatus includes an acquiring unit acquiring a detection time interval between said first servo frame and a second servo frame detected subsequently to the first servo frame from a table storing a detection time interval between a specific servo frame and a servo frame detected subsequently to the specific servo frame. The apparatus includes a differential calculation unit calculating a differential between the detection time interval acquired by said acquiring unit and a reference time interval. The apparatus includes and a correction unit correcting an estimated position of said second servo frame based on the differential calculated by said differential calculation unit.

Additional objects and advantages of the embodiment will be set forth in part in the description which follows, and in part will be obvious from the description, or may be learned by practice of the embodiment. The object and advantages of the embodiment will be realized and attained by means of the elements and combinations particularly pointed out in the appended claims.

It is to be understood that both the foregoing general description and the following detailed descriptions are exemplary and explanatory only and are not restrictive of the embodiment, as claimed.

BRIEF DESCRIPTION OF THE DRAWING

FIG. 5 shows equations 1 through 3 for servo frame position corrections calculated by the servo frame position correction unit;

FIG. 6 shows equations 4 through 6 for servo frame position corrections calculated by the servo frame position correction unit;

FIG. 7 shows equations 7 and 8 for servo frame position corrections calculated by the servo frame position correction unit;

DETAILED DESCRIPTION OF THE EMBODIMENT

With reference to the accompanying drawings, an embodiment of the present technique will be disclosed. It will be appreciated that the example is merely illustrative of aspects of the present technique. Unless otherwise stated, the embodiment of the technique, as set forth herein, is intended to be illustrative, not limiting.

Figure 1:
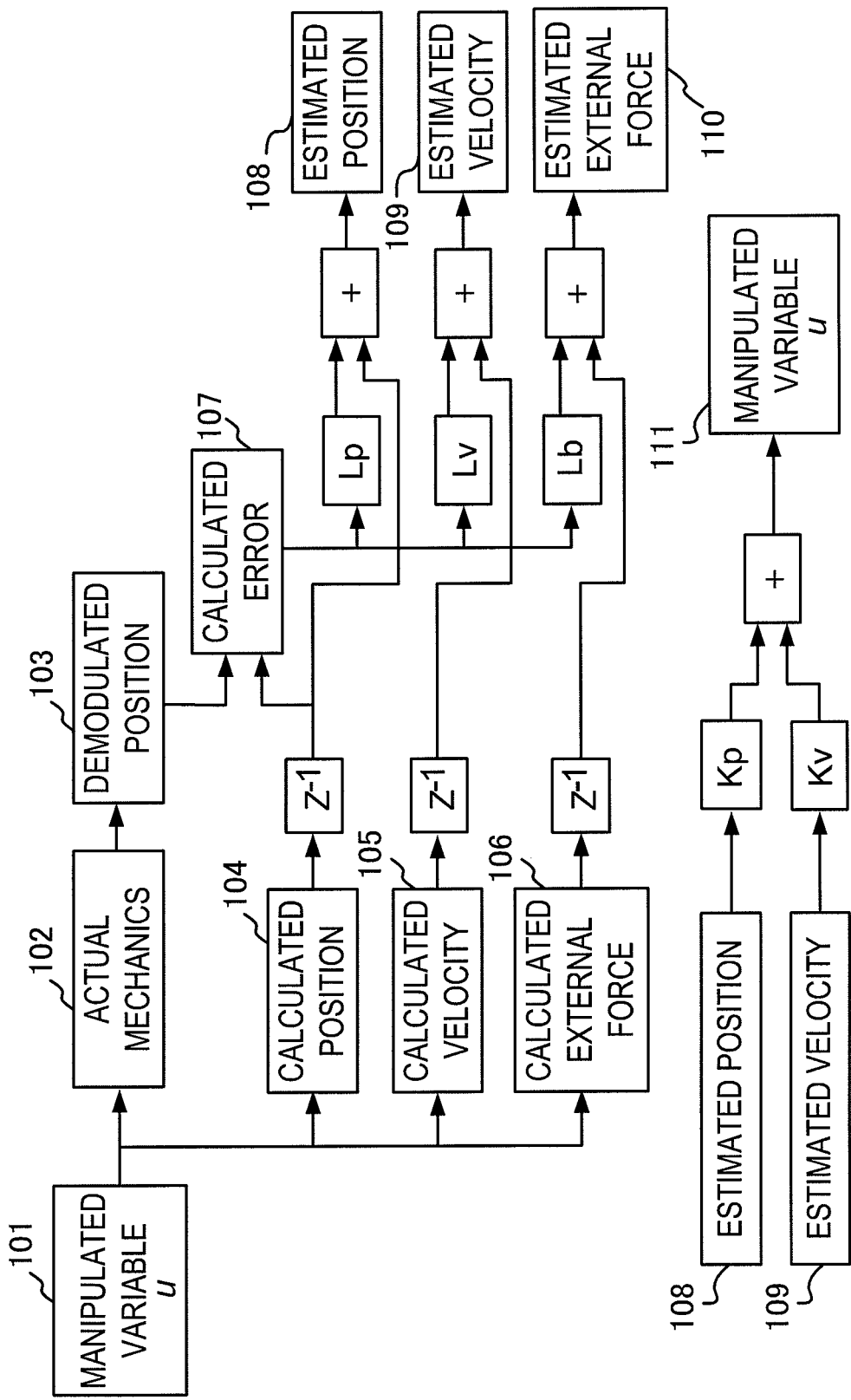
FIG. 1 is a block diagram illustrating control function of the conventional magnetic disk drive.
Figure 2:
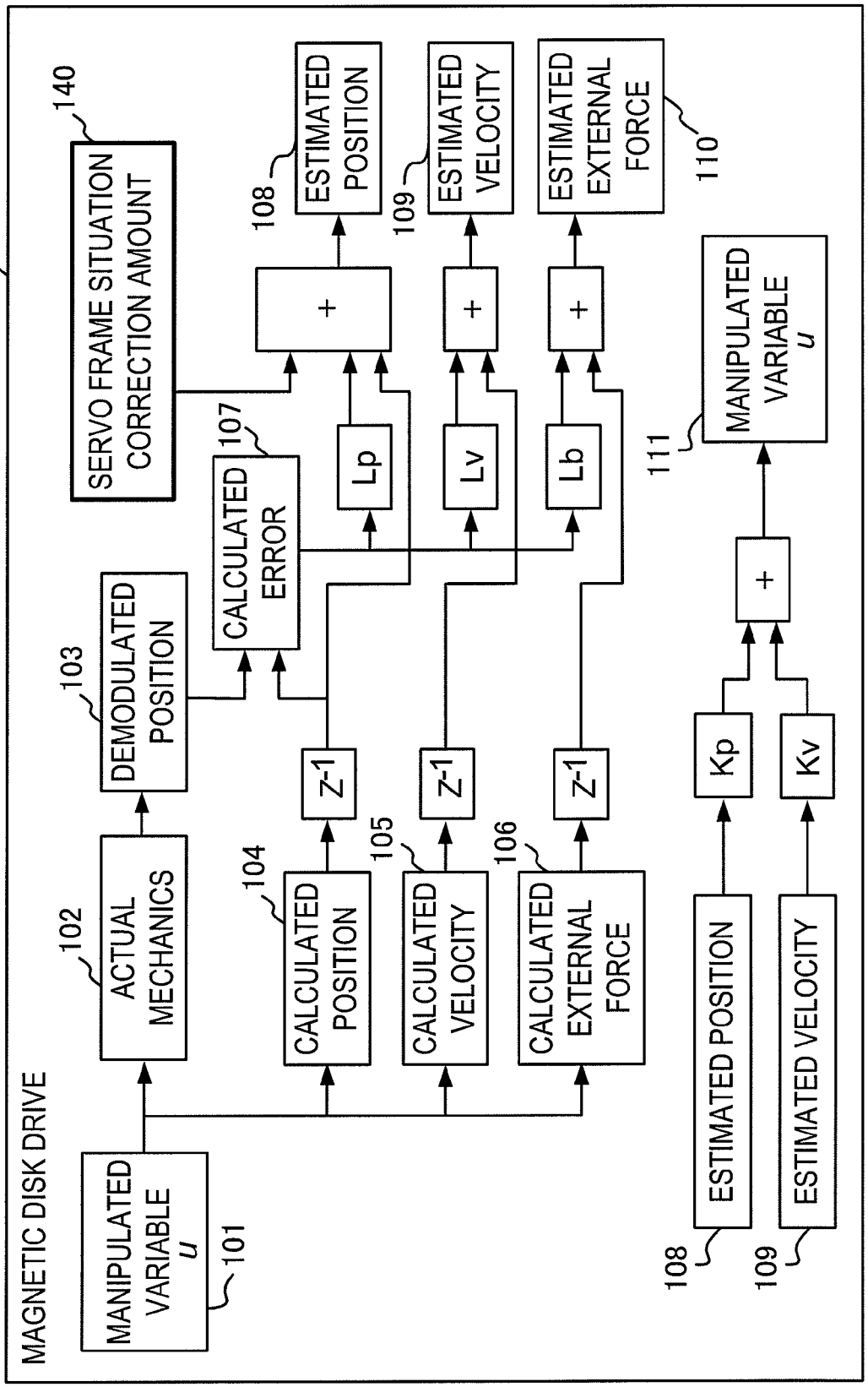
FIG. 2 illustrates an example of the block diagram of the magnetic disk drive.

FIG. 2 illustrates the block diagram of the control function of the magnetic disk drive according to the embodiment. A magnetic disk drive 1 calculates the estimated position by adding a servo frame position correction amount 140 in FIG. 2 to the calculated position shown in FIG. 1. The servo frame position correction amount 140 is calculated by a servo frame position correction unit 100 included in the magnetic disk drive 1.

Figure 3:
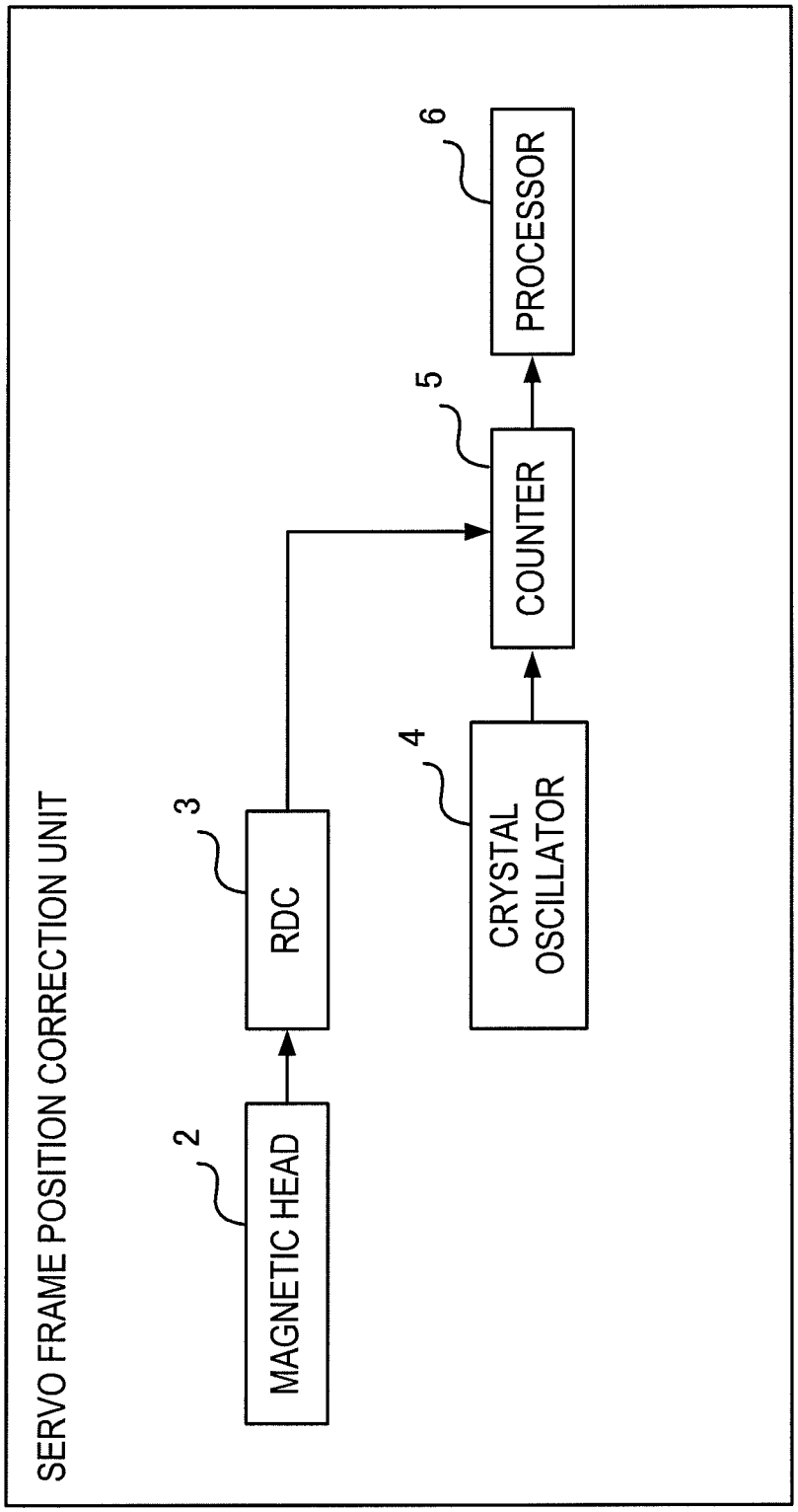
FIG. 3 is a block diagram illustrating the servo frame position correction unit.

The structure of the servo frame position correction unit 100 for calculating a correction amount of a servo frame position will be disclosed with reference to the block diagram shown in FIG. 3.

The servo frame position correction unit 100 has: a read channel (RDC) 3 for demodulating signals read with a magnetic head 2 to detect servo frames; a counter 5 for counting time at which the servo frames are detected according to frequencies oscillated by a crystal oscillator 4 as a count value; and a processor 6 for detecting intervals between the servo frames by subtracting a previous count value counted by the counter 5 from a count value counted next to the value. The processor 6 calculates a correction amount of the servo frame position based on the detected servo frame interval.

Figure 4:
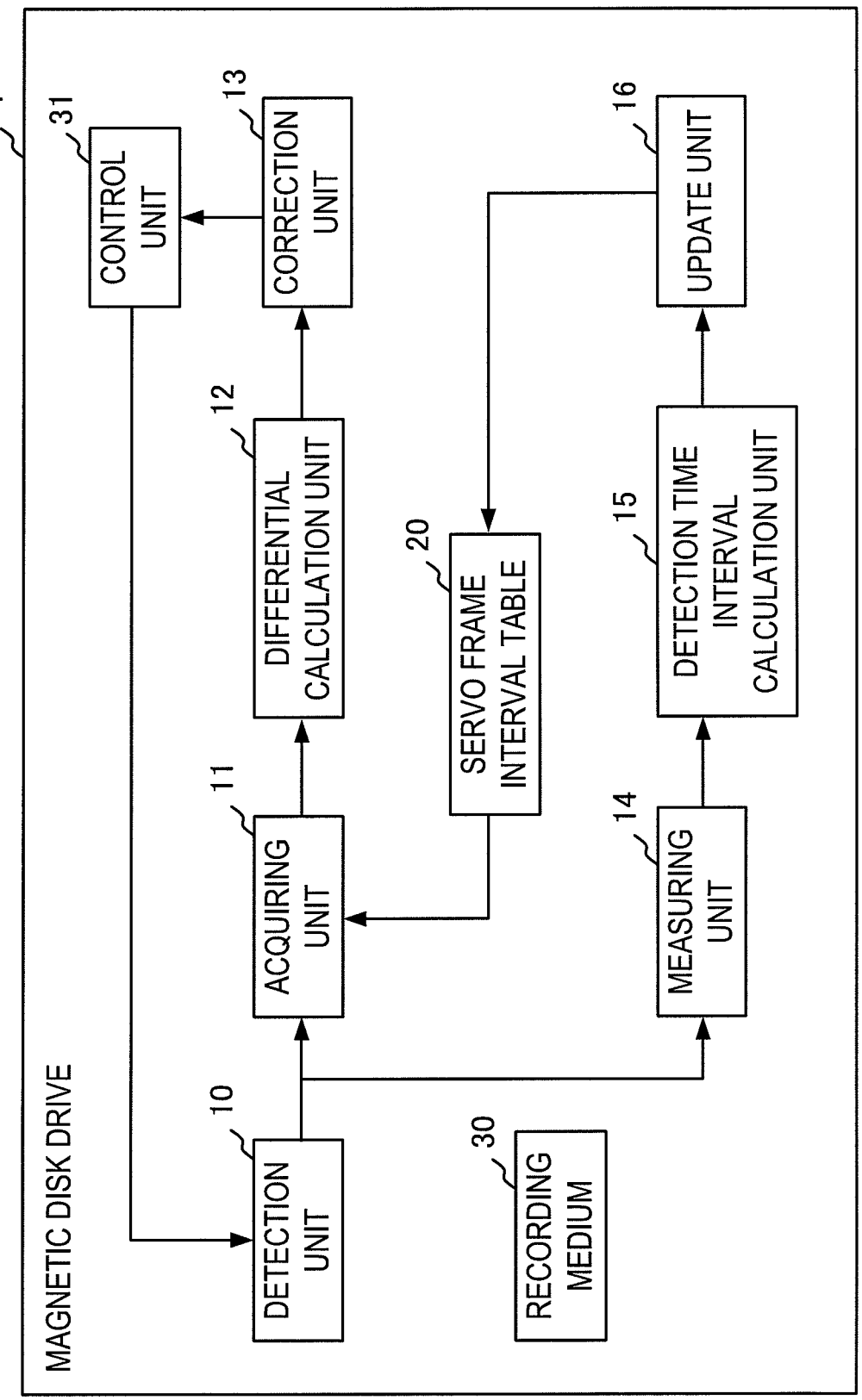
FIG. 4 illustrates an example of the block diagram illustrating the function of the magnetic disk drive.

FIG. 4 is the block diagram illustrating the function of the magnetic disk drive 1. The magnetic disk drive 1 has a detection unit 10, an acquiring unit 11, a differential calculation unit 12, a correction unit 13, a measuring unit 14, a detection time interval calculation unit 15, an update unit 16, a servo frame interval table 20, a recording medium 30 and a control unit 31.

The detection unit 10 detects a first servo frame from the recording medium 30 on which multiple servo frames are arranged. The acquiring unit 11 acquires the detection time interval between the first servo frame detected by the detection unit 10 and a second servo frame detected subsequently to the servo frame, from the servo frame interval table 20.

The differential calculation unit 12 calculates a differential between the detection time interval acquired by the acquiring unit 11 and a specific pre-defined reference servo frame time (a reference time interval). The reference servo frame time interval is defined with an assumption that the recording medium is not decentered and servo frames arranged thereon are detected at equal intervals. The correction unit 13 corrects an estimated position, which is the position shown in FIG. 1 estimated by the conventional method, of the second servo frame based on the differential calculated by the differential calculation unit 12.

The measuring unit 14 measures a detection time at which a servo frame is detected by the detection unit 10. The detection time interval calculation unit 15 calculates detection time intervals based on the detection time measured by the measuring unit 14. The update unit 16 updates the detection time interval stored in the servo frame interval table 20 to the detection time interval calculated by the detection time interval calculation unit 15.

The servo frame interval table 20 stores a detection time interval between a specific servo frame and a servo frame detected subsequently to the specific servo frame, corresponding to an identification number of the servo frame. The recording medium 30 is a thin discoidal medium in which data are recorded magnetically. The control unit 31 controls the magnetic head to move to a position corrected by the correction unit 13.

The servo frame position correction unit 100 functions are achieved through each of the functions of the detection unit 10, the acquiring unit 11, the differential calculation unit 12, the correction unit 13, the measuring unit 14, the detection time interval calculation unit 15, the update unit 16, and the servo frame interval table 20.

Servo frame position correction calculated by the servo frame position correction unit 100 will be disclosed with reference to FIGS. 5 through 7.

Where
time t=0;
position=x;
velocity=v;
acceleration=a;
a position and a velocity after an infinitesimal amount of time t=Δt has elapsed is obtained by equation 1 shown in FIG. 5 since acceleration a in the period from t=0 to t=Δt is constant.

Equation 1 is expressed in International System of Units, Meter Kilogram Second (MKS) system. Therefore, the units in the MKS system are replaced with units commonly used for magnetic disk drive, track and sample time. 1 sample time=1 second. More specifically,
where
Pos (t): a position at time t;
Vel (t): velocity at time t;
U: manipulated variable or controlled variable based on an acceleration;
After an elapse of time Td/Ts, equation 2 is used.

In particular, where 1 sample advances, equation 3 is used. The matrix on the right side and the first term of equation 3 is a control matrix, and is labeled as $Z^{-1}$ in FIGS. 1 and 2.

All control matrices are designed in reference to the unit of sample time Ts. The following example considers how a control matrix changes when a servo frame interval (SFI) varies infinitesimally due to a decentering of a virtual circle (circle with eccentricity). A correction of an SFI variation where 1 sample and Δ elapse is given by equation 4 shown in FIG. 6.

Where Δ is infinitesimal, equation 5 is commonly used as an approximation. Where the approximation expressed in equation 5 is substituted into equation 4, equation 6 is used.

Expanding equation 6, the correction amount of the servo frame is expressed by equation 7 shown in FIG. 7.

A position PosBar and velocity VelBar obtained from the control matrix may be corrected by applying the correction calculation. In practice, Δ×U is infinitesimal, therefore, only a position is a factor in the calculation of a correction amount of the servo frame. The final correction amount of the servo frame is expressed by equation 8. Accordingly, the servo frame position may be corrected by adding a summation of the estimated velocity shown in FIGS. 1 and 9 and Δt (SFI time).

Figure 8:
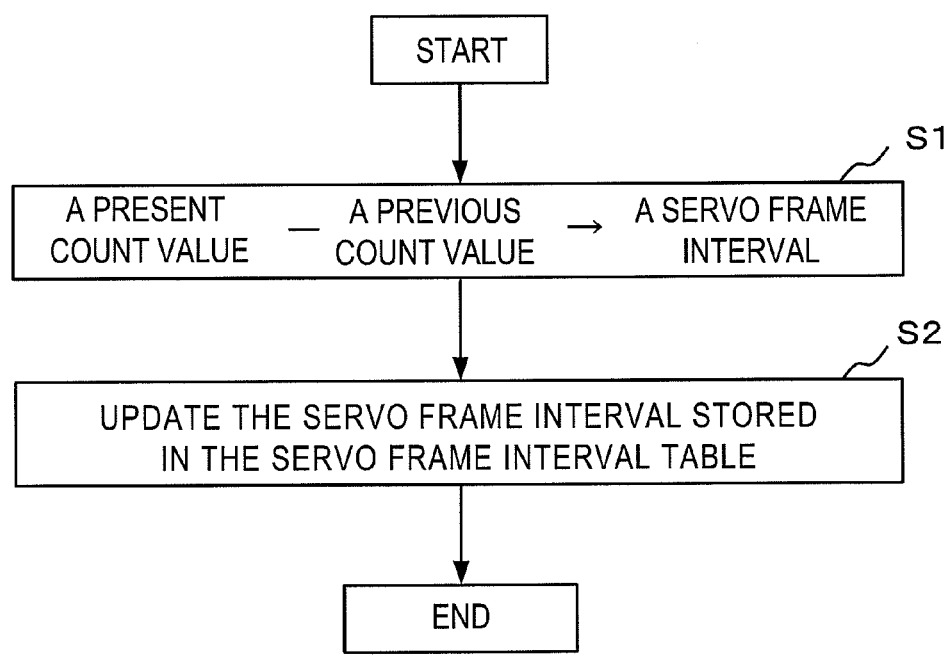
FIG. 8 is a flow chart illustrating an example of servo frame interval detection executed by the servo frame position correction unit.

With reference to the flow chart shown in FIG. 8, detection and update of the servo frame interval by the servo frame position correction unit 100 will be disclosed.

The detection unit 10, which includes the magnetic head 2 and the RDC 3, detects the servo frames from signals read from the recording medium 30. The measuring unit 14, which includes the crystal oscillator 4 and the counter 5, measures the time, as count values, at which the servo frames are detected.

The detection time interval calculation unit 15 (processor 6) reads a present count value and subtracts a previous count value from the count value to detect a time interval of servo frames in operation S1.

In operation S2, the update unit 16 (processor 6) updates the servo frame time interval corresponding to an identification number of a servo frame that is currently processed and stored in the servo frame interval table 20, to the servo frame time interval detected in operation S1.

By detecting the servo frames and updating the servo frame intervals stored in the servo frame interval table 20, the servo frame position correction unit 100 detects a decentering error more accurately.

Figure 9:
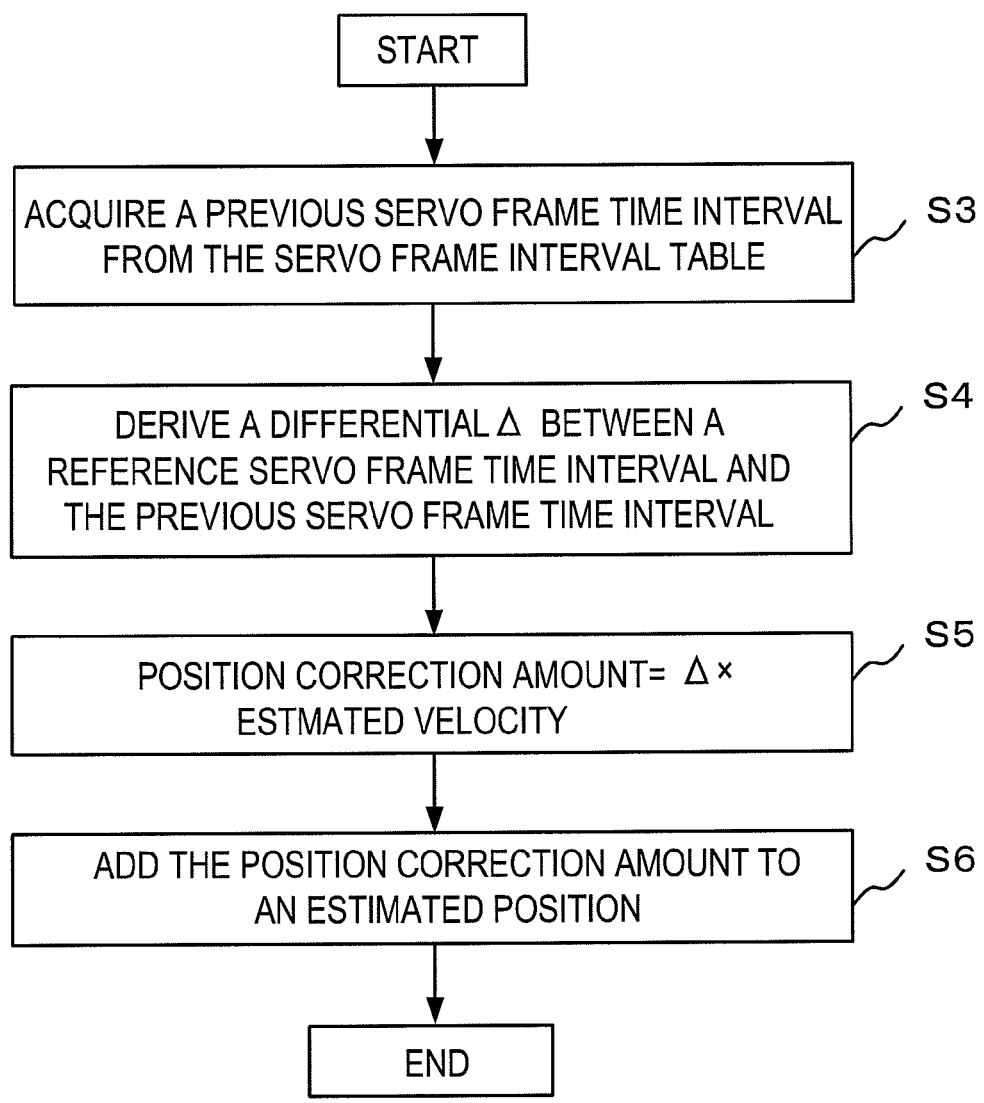
FIG. 9 is a flow chart illustrating an example of a servo frame correction executed by the servo frame position correction unit.

With reference to the flow chart shown in FIG. 9, servo frame correction executed by the servo frame position correction unit 100 will be disclosed.

The acquiring unit 11 (processor 6) acquires, in operation S3, the servo frame time interval, which is the detected time interval between the servo frame detected by detection unit 10 and the servo frame detected subsequently, corresponding to the servo frame number, which is currently being processed, detected by detection unit 10. The differential calculation unit 12 (processor 6) calculates, in operation S4, a differential Δ between the detected servo frame time interval and the predefined reference servo frame time interval.

The correction unit 13 (processor 6) calculates, in operation S5, a position correction amount of the servo frame by multiplying Δ by the estimated velocity. Then the correction amount calculated in operation S5 is added to an estimated position in operation S6.

Then, based on the estimated position corrected by the correction unit 13, the control unit 31 moves the detection unit 10 by PID control.

In this embodiment, the servo frame position correction unit 100 is included in the magnetic disk drive 1. However, the servo frame position correction unit 100 may be provided as a servo frame interval correction apparatus for correcting servo frame positions.

Accordingly, precise servo frame positions on a recording medium having a deviation from a rotation center may be obtained.

Although the embodiment of the present invention has been described in detail, it should be understood that the various changes, substitutions, and alterations could be made hereto without departing from the spirit and scope of the invention.

What is claimed is:

1. A servo frame interval correction apparatus for correcting an interval between a servo frame and a servo frame formed on a recording medium, comprising:
    a detection unit detecting a first servo frame formed on said recording medium;
    an acquiring unit acquiring a detection time interval between said first servo frame and a second servo frame detected subsequently to the first servo frame from a table storing a detection time interval between a specific servo frame and a servo frame detected subsequently to the specific servo frame;
    a differential calculation unit calculating a differential between the detection time interval acquired by said acquiring unit and a reference time interval; and
    a correction unit correcting an estimated position of said second servo frame based on the differential calculated by said differential calculation unit.

2. The servo frame interval correction apparatus according to claim 1, further comprising:
    a measuring unit measuring detection time at which the servo frame is detected by said detection unit;
    a detection time interval calculation unit calculating said detection time interval based on the detection time measured by said measuring unit; and
    an update unit updating the detection time interval stored in said table to the detection time interval calculated by said detection time interval calculation unit.

3. The servo frame interval correction apparatus according to claim 1, wherein said correction unit calculates a correction value by adding the differential calculated by said differential calculation unit and estimated velocity that is movement velocity of said detection unit at said estimated position; and corrects said estimated position by adding the correction value to said estimated position.

4. The servo frame interval correction apparatus according to claim 2, wherein said detection time interval calculation unit calculates a value by subtracting the detection time measured by said measuring unit at the time which the servo frame that is one before said specific servo frame is detected from the detection time measured by said measuring unit at the time which the specific servo frame is detected by said detection unit, as the detection time interval of the servo frame detected one before said specific servo frame.

5. The servo frame interval correction apparatus according to claim 1, wherein said acquiring unit determines a detection time interval defined with an assumption that said servo frame is detected at an equal-spaced interval as a reference time interval.

6. A storage apparatus for controlling correction of an interval between a servo frame and a servo frame formed on a recording medium, comprising:
 a detection unit detecting a first servo frame formed on said recording medium;
 an acquiring unit acquiring a detection time interval between said first servo frame and a second servo frame detected subsequently to the first servo frame from a table storing a detection time interval between a specific servo frame and a servo frame detected subsequently to the specific servo frame;
 a differential calculation unit calculating a differential between the detection time interval acquired by said acquiring unit and a reference time interval;
 a correction unit correcting an estimated position of said second servo frame based on the differential calculated by said differential calculation unit; and
 a control unit controlling said detection unit to move to a position corrected by said correction unit.

7. The storage apparatus according to claim 6, further comprising:
 a measuring unit measuring detection time at which the servo frame is detected by said detection unit;
 a detection time interval calculation unit calculating said detection time interval based on a detection time measured by said measuring unit; and
 an update unit updating the detection time interval stored in said table to the detection time interval calculated by said detection time interval calculation unit.

8. The storage apparatus according to claim 6, wherein said correction unit calculates a correction value by adding the differential calculated by said differential calculation unit and estimated velocity that is movement velocity of said detection unit at said estimated position; and corrects said estimated position by adding the correction value to said estimated position.

9. The storage apparatus according to claim 7, wherein said detection time interval calculation unit calculates a value by subtracting the detection time measured by said measuring unit at the time which the servo frame that lies one before said specific servo frame is detected from the detection time measured by said measuring unit at the time which the specific servo frame is detected by said detection unit, as a detection time interval of the servo frame detected one before the specific servo frame.

10. The storage apparatus according to claim 6, wherein said acquiring unit determines a detection time interval defined with an assumption that said servo frame is detected at an equal-spaced interval as a reference time interval.

11. A servo frame interval correction method for correcting an interval between a servo frame and a servo frame formed on a recording medium, comprising:
 detecting a first servo frame formed on said recording medium;
 acquiring a detection time interval between said first servo frame and a second servo frame detected subsequently to said first servo frame from a table storing a detection time interval between a specific servo frame and a servo frame detected subsequently to the specific servo frame;
 calculating a differential between said detection time interval acquired and a reference time interval; and
 executing a correction process correcting an estimated position of said second servo frame based on said differential calculated.

12. The servo frame interval correction method according to claim 11, further comprising:
 measuring detection time at which the servo frame is detected;
 calculating said detection time interval based on said detection time measured; and
 executing an update process updating the detection time interval stored in said table to the detection time interval calculated.

13. The servo frame interval correction method according to claim 11, wherein said correction process calculates a correction value by adding said differential calculated to estimated velocity that is movement velocity of the head at said estimated position; and corrects said estimated position by adding the correction value to said estimated position.

14. The servo frame interval correction method according to claim 12, wherein a value is calculated by subtracting the detection time at which the servo frame that lies one before said specific servo frame is detected from the detection time at which said specific servo frame is detected as a detection time interval of the servo frame detected before said specific servo frame.

15. The servo frame interval correction method according to claim 11, wherein said reference time interval is a detection time interval defined with an assumption that said servo frame is detected at an equal-spaced interval.

\* \* \* \* \*